(12) United States Patent
Watanabe et al.

(10) Patent No.: US 7,493,150 B2
(45) Date of Patent: Feb. 17, 2009

(54) FOLDING ELECTRIC DEVICE HAVING PERPENDICULAR AND HORIZONTAL SHAFTS

(75) Inventors: Yosuke Watanabe, Tokyo (JP); Shuichi Ono, Tokyo (JP); Hideo Mitsuhashi, Tokyo (JP); Tomoji Minowa, Tokyo (JP); Masatomo Mizuta, Tokyo (JP)

(73) Assignee: NEC Corporation, Tokyo (JP)

( * ) Notice: Subject to any disclaimer, the term of this patent is extended or adjusted under 35 U.S.C. 154(b) by 150 days.

(21) Appl. No.: 10/801,575

(22) Filed: Mar. 17, 2004

(65) Prior Publication Data

US 2004/0192422 A1  Sep. 30, 2004

(30) Foreign Application Priority Data

Mar. 26, 2003  (JP) .............................. 2003-085318

(51) Int. Cl.
 *H04M 1/00*  (2006.01)
(52) U.S. Cl. ................... 455/575.3; 361/681; 455/575.1
(58) Field of Classification Search ... 455/575.1–575.3, 455/550, 347, 90, 348; 361/680–687, 752, 361/724, 725, 755, 814; D14/137–138; 16/366
See application file for complete search history.

(56) References Cited

U.S. PATENT DOCUMENTS

| | | | |
|---|---|---|---|
| 6,347,433 B1 | 2/2002 | Novin et al. | |
| 6,804,861 B2* | 10/2004 | Hsu | 16/366 |
| 6,813,146 B2* | 11/2004 | Haraguchi et al. | 361/681 |
| 6,830,456 B2* | 12/2004 | Obermeyer | 439/6 |
| 6,867,961 B2* | 3/2005 | Choi | 361/681 |
| 6,876,545 B2* | 4/2005 | Tseng et al. | 361/681 |
| 6,958,902 B2* | 10/2005 | Tseng et al. | 361/681 |
| 2002/0155740 A1* | 10/2002 | Sawada et al. | 439/165 |
| 2003/0052857 A1 | 3/2003 | Pappas | |
| 2003/0064758 A1* | 4/2003 | Mizuta et al. | 455/566 |
| 2003/0083063 A1* | 5/2003 | Wang et al. | 455/427 |
| 2003/0153372 A1* | 8/2003 | Shimamura et al. | 455/575 |
| 2003/0203747 A1* | 10/2003 | Nagamine | 455/575.3 |
| 2004/0110529 A1* | 6/2004 | Watanabe et al. | 455/550.1 |
| 2004/0127269 A1* | 7/2004 | Nonaka | 455/575.3 |
| 2004/0248628 A1* | 12/2004 | Taninai | 455/575.3 |
| 2005/0177978 A1* | 8/2005 | Satoh et al. | 16/319 |

FOREIGN PATENT DOCUMENTS

| | | |
|---|---|---|
| EP | 0 588 210 A1 | 3/1994 |
| EP | 0 720 339 A2 | 7/1997 |
| EP | 1 353 488 A2 | 10/2003 |
| JP | 5-211547 A | 8/1993 |
| JP | 11-30226 A | 2/1999 |
| JP | 11-215218 A | 8/1999 |
| JP | 2001-156893 A | 6/2001 |
| JP | 2002-135380 | 5/2002 |
| JP | 2002-158758 A | 5/2002 |

\* cited by examiner

*Primary Examiner*—George Eng
*Assistant Examiner*—Khawar Iqbal
(74) *Attorney, Agent, or Firm*—Sughrue Mion, PLLC (57) ABSTRACT

A folding electric has an upper unit and lower unit. A hinge connects the upper unit to the lower unit. The hinge includes at least a perpendicular opening and closing shaft to open and close the upper unit with respect to the lower unit and a horizontal rotation shaft, fixed vertically to the surface of the lower unit, to rotate the upper unit with respect to the lower unit coming in contact with each other.

27 Claims, 12 Drawing Sheets

FOLDING ELECTRIC DEVICE HAVING PERPENDICULAR AND HORIZONTAL SHAFTS

BACKGROUND OF THE INVENTION

1. Field of the Invention

The present invention relates to a folding electric device, and more particularly, to a folding electric device having perpendicular and horizontal shafts.

2. Description of the Related Art

Conventional structures for electric devices, especially mobile phones, include a straight type and a folding type. Among these, the folding type mobile phone is more widely preferred because it can be stored in a compact manner. Therefore, the demand for this type of structure it is increasing.

Figure 1:
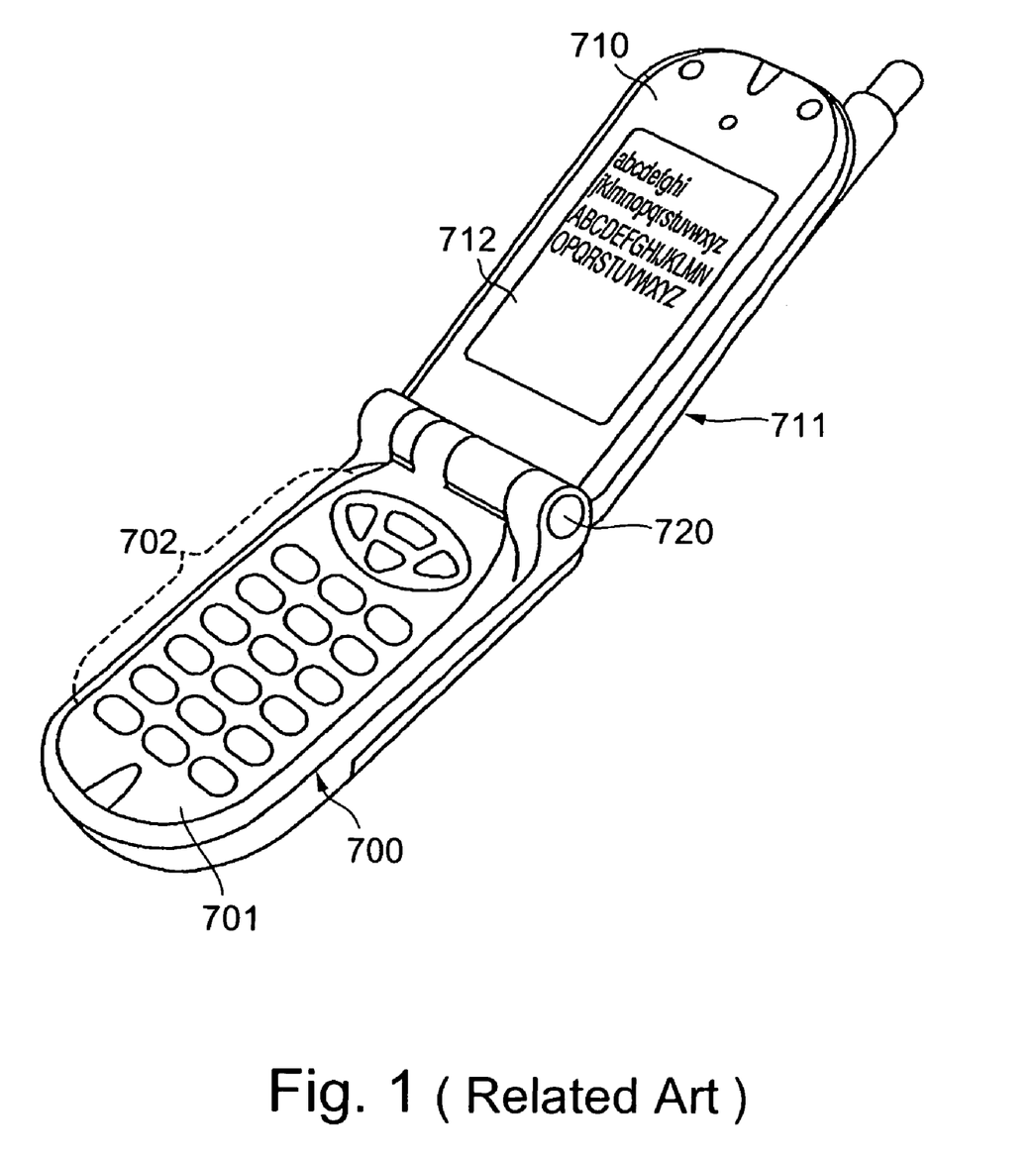
FIG. 1 is a perspective view of a conventional mobile phone.

FIG. 1 describes one such conventional folding mobile phone 1. FIG. 1 is a perspective view of a conventional mobile phone.

In FIG. 1, a folding mobile phone has substantially semi-elliptic lower and upper units 700 and 711. Lower unit 700 has operating section 702 and upper unit 711 has rectangular display 712. Joint member 720 connects units 700 and 711 with each other so that an operating section face 701 and a display attachment face 710 are opposed to each other when the phone is folded. Upper unit 711 is capable of being opened and closed with respect to lower unit 700.

Mobile phones are now used as a personal digital assistants having not only a telecommunication function but also a browser function such as Internet, transmission and reception of e-mail, schedule control, etc. Therefore, display contents are more varied and include character information, pictures, graphics, etc. As a result, the size of the display section has increased.

In the conventional folding mobile phone, when the user looks at a display section or performs any operation, it is necessary to position the upper and lower units in an open state. Because the upper and lower units must be opened and closed frequently, it is not very convenient for the user. Therefore, there is room for improving the conventional folding mobile phone in order to make it easier to use.

Also in the conventional folding mobile phone, since the display contents are displayed to match a perpendicularity-oriented screen, when displayed characters are read, the number of characters on each line is small. As a result, the user may have difficulty in reading the display contents.

Also, when wide images are displayed, the image must be reduced in size, or the user must scroll back and forth to view the entire image. This is another usability problem with the conventional folding mobile phone.

Furthermore, since the joint member 720 as shown in FIG. 1 must be secured, design options are limited.

In addition to the mobile phone, other folding equipment, such as personal digital assistants (PDAs), in which a display and an operating section are arranged separately in two units connected to each other so as to be capable of being opened and closed in the same manner as described above, generally have the same problems.

Figures 2A, 2B, 2C:
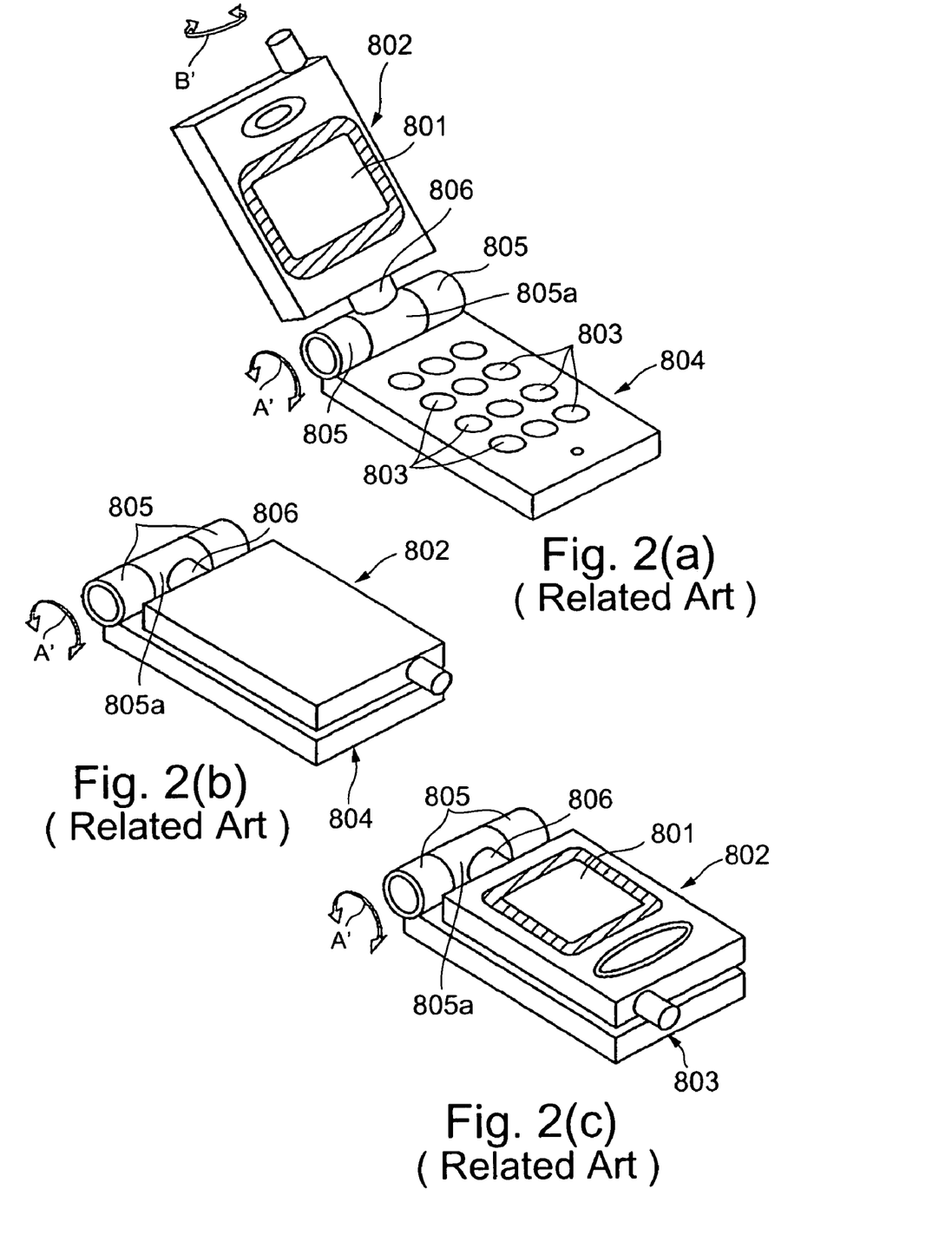
FIGS. 2(a)-2(c) are perspective views of another conventional folding mobile phone.

Another conventional folding mobile phone is disclosed in the Japanese Patent Application Publication Laid-Open Kokai No. H11-30226. FIGS. 2(a)-2(c) are perspective views of the folding mobile phone described in that Publication.

In FIGS. 2(a)-2(c), the folding mobile phone has lower and upper units 804 and 802, respectively. Lower unit 804 has operating section 803 and upper unit 802 has display 801. Pivot 806 is provided at right angles on journal 805a of hinge 805 connecting upper unit 802 to lower unit 804. Upper unit 802 can be opened and closed as shown by arrow A' with hinge 805. Upper unit 802, furthermore, can be turned as shown by arrow B' with pivot 806 so that display 801 is exposed even if the folding mobile phone is folded.

This Publication also discloses a configuration in which a rotation restricting mechanism for restricting rotation at a reversing position and a click locking mechanism for holding the rotation restricted state are provided in pivot 806.

Figure 3A:
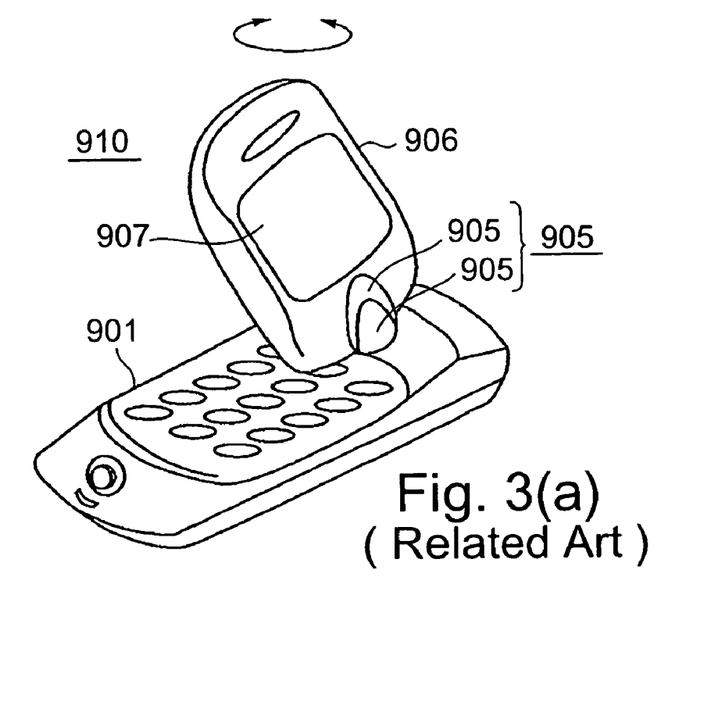
FIG. 3(a) is a perspective view and FIGS. 3(b)-3(c) are plane views of another conventional folding mobile phone.

Still another conventional folding mobile phone is disclosed in the Japanese Patent Application Publication Laid-Open Kokai No. H11-215218. FIG. 3(a) is a perspective view and FIGS. 3(b)-3(c) are plane views of the folding mobile phone described in that Publication.

Figure 3B:
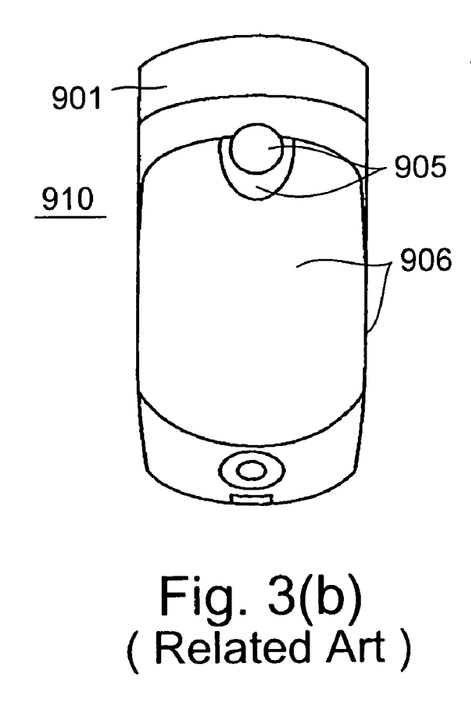
Figure 3C:
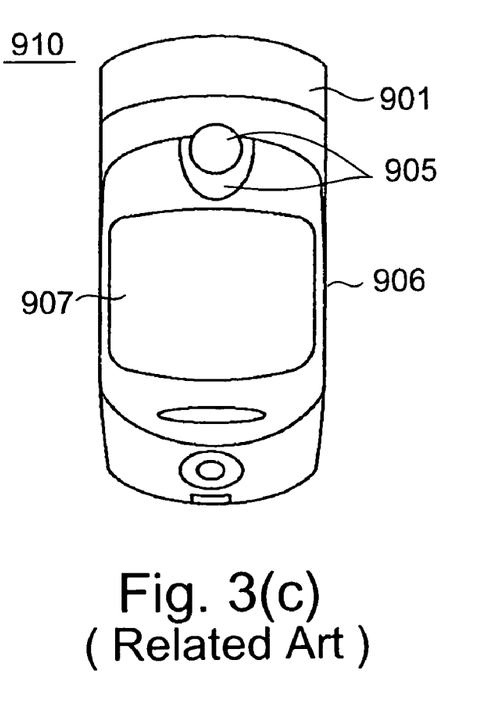

In FIGS. 3(a)-3(c), mobile phone 910 is configured so that upper unit 906 provided with a display 907 can be turned over and closed as shown by the arrow with hinge 905. Hinge 905 is formed by a ball joint. Hinge 905 connects upper unit 906 to lower unit 901 so that the phone can be opened and closed, and supports upper unit 906 so that upper unit 906 can turn relative to lower unit 901 in an opened state.

Moreover, the Japanese Patent Application Publication Laid-Open Kokai No. 2002-158758 discloses still another convention folding mobile phone. The Publication shows a mobile phone wherein the user can look at a display or can perform simple operations when the upper and lower units are not opened.

The Japanese Patent Application Publication Laid-Open Kokai No. 2001-156893 shows a mobile phone that switches the display from a perpendicular orientation to a horizontal orientation, or vice versa, along with the rotation of the display unit.

The Japanese Patent Application Publication Laid-Open Kokai No. 5-211547 shows a mobile phone wherein a lower unit is pivotally supported on a upper unit and joint face of the units are formed into a curve. Thus a receiver and a transmitter have a distance and an angle suitable for communication.

SUMMARY OF THE INVENTION

The object of the present invention is to provide an improved structure of a folding electric device.

In order to achieve the forgoing object, a folding electric device according to the present invention includes: an upper unit; a lower unit; and a hinge that connects said upper unit to the lower unit. The hinge includes: (a) a perpendicular opening and closing shaft to open and close the upper unit with respect to the lower unit; and (b) a horizontal rotation shaft, fixed vertically on the surface of the lower unit, to rotate the upper unit with respect to the lower unit coming in contact with each other. The present invention may further include a winding flexible board, wound around one of the ends of the perpendicular opening and closing shaft, for electrically connecting the upper unit to the lower unit. Also, the present invention may further include an winding flexible board, wound around the horizontal rotation shaft, for electrically connecting the upper unit to the lower unit. Moreover, the present invention may include an operation input section, mounted on the hinge and electrically connected to the winding flexible board so that a user can operate the operation input section when the folding electric device is in a folded state. In the present invention, the folding electric device may be a folding mobile phone.

The present invention may further include a display arranged on the upper unit. Still furthermore, the present invention may include input keys arranged on the lower unit.

Another embodiment of a folding electric device according to the present invention includes: an upper unit; a lower unit; and a hinge that connects the upper unit to the lower unit. The hinge includes: (a) a perpendicular opening and closed shaft to open and close the upper unit with respect to the lower unit; (b) a horizontal rotation shaft to rotate the upper unit with respect to the lower unit; (c) brackets fixed at the right and left of the horizontal rotation shift in a direction perpendicular to the horizontal rotation shaft and connected to the perpendicular opening and closed shaft in the opening and closing shaft direction of said bracket; (d) a base, on which the horizontal rotation shaft is mounted, fixed to the lower unit; and (e) a mount provided between the brackets. The present invention may further include a winding flexible board, wound around one of the ends of said perpendicular opening, for electrically connecting the upper unit to lower unit. The present invention may further include a bobbin, arranged between the horizontal rotation shaft and the base, for winding the winding flexible board around the horizontal rotation shaft. Moreover, the present invention may further include a flexible board fixing member for fixing the flexible board. Still furthermore, the present invention may include an operation input section, mounted on the mount, for electrically connecting to the winding flexible board so that a user can operate the operation input section when the folding electric device is in a folded state. In the present invention, the folding electric device may be a folding mobile phone. The present invention may further include a display arranged on the upper unit. Also, the present invention may further include input keys arranged on the lower unit.

BRIEF DESCRIPTION OF THE DRAWINGS

These and other objects, features and advantages of the invention will be become fully apparent from the following detailed description taken in conjunction with accompanying drawings.

FIG. 12 (a) is an exploded view showing a construction of a perpendicular open and closing shaft and FIG. 12 (b) is a sectional view of a front cover engagement portion in a folding mobile phone according to the present invention.

DETAILED DESCRIPTION OF THE PREFERRED EMBODIMENTS

Figure 4:
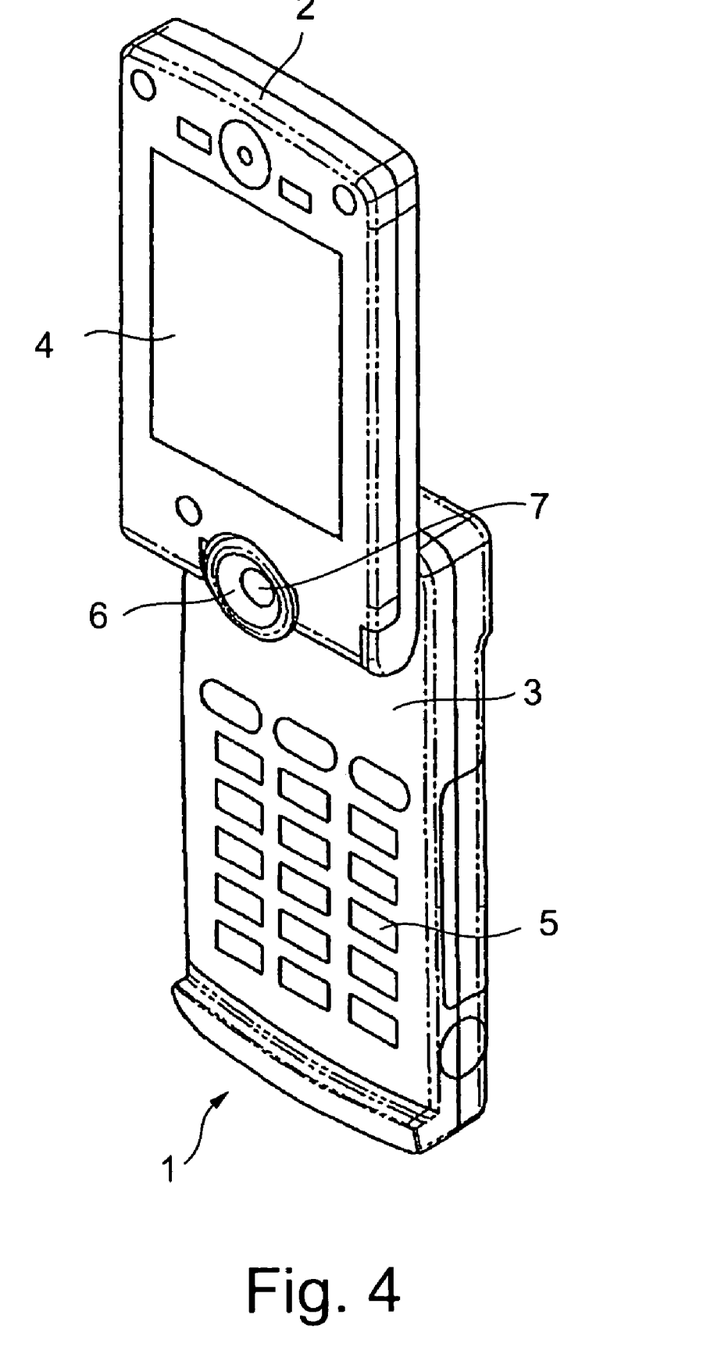
FIG. 4 is a perspective view of a preferred embodiment of a folding mobile phone when a phone is in an open state according to the present invention.

FIG. 4 shows a perspective view of a preferred embodiment of a folding mobile phone when a phone is in an open state according to the present invention.

Referring to FIG. 4, folding mobile phone 1 has upper unit 2 and lower unit 3. Upper unit 2 has display 4 and lower unit 3 has input keys 5. Units 2 and 3 are connected to each other by a hinge 6 that has two axis of rotation shafts that are capable of being opened, folded and turned. Operation input section 7 is arranged at the apex of the rotation shaft of hinge 6.

Upper unit 2 can be opened through 180 degrees with respect to lower unit 3 via hinge portion 6.

Figure 5:
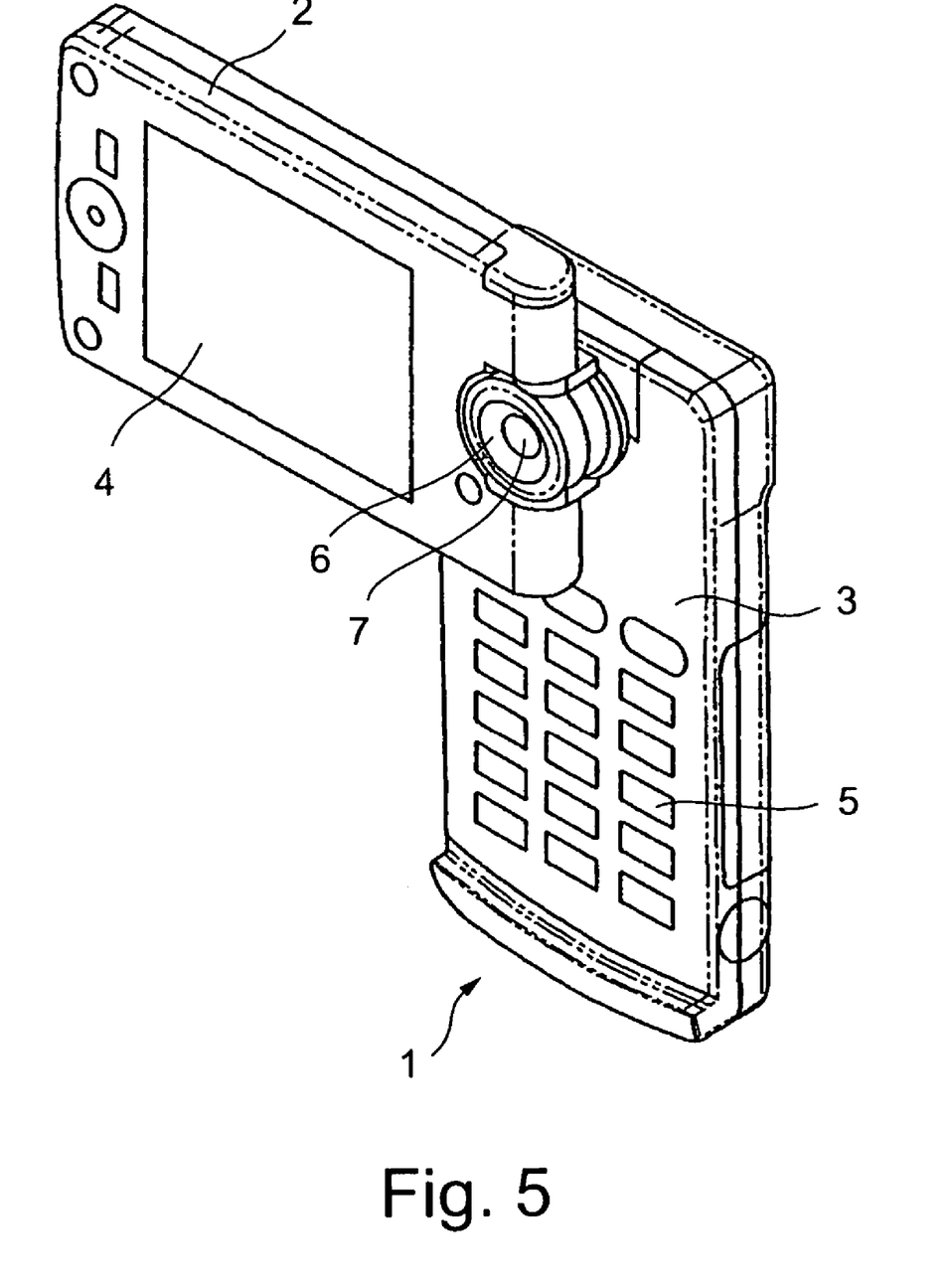
FIG. 5 is a perspective view of a preferred embodiment showing rotation of an upper unit with respect to a lower unit in a folding mobile phone according to the present invention.
Figure 6:
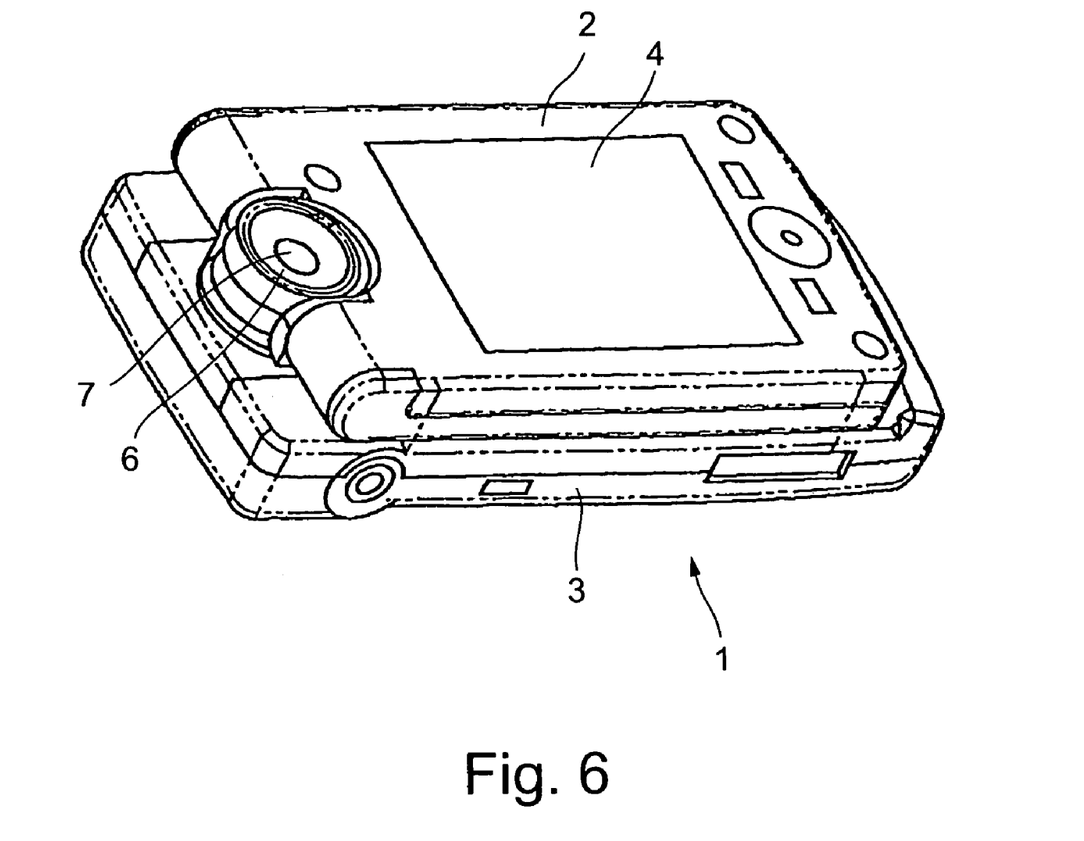
FIG. 6 is a perspective view of a preferred embodiment of a folding mobile phone when the phone is in a folded state according to the present invention.

FIG. 5 shows a perspective view of a preferred embodiment showing rotation of upper unit 2 with respect to lower unit 3 of folding mobile phone 1 according to the present invention. FIG. 6 is a perspective view of a preferred embodiment of folding mobile phone 1 when folding mobile phone 1 is in a folded state according to the present invention.

As shown in FIGS. 5 and 6, upper unit 2 can be turned through 180 degrees to the right and left horizontally with respect to lower unit 3 via hinge 6 from a perpendicularly opened state.

In this embodiment, display 4 can be exposed as shown in FIG. 6, even if folding mobile phone 1 is in a folded state. Further, folding mobile phone 1 has an operation input section 7 for operating display 4 in hinge 6, so that folding mobile phone 1 can be used for playing a game and being easily operated by operation input section 7 even if folding mobile phone 1 is in a folded state.

The details of hinge 6 and the surrounding area of folding mobile phone 1 are explained below.

Figure 7:
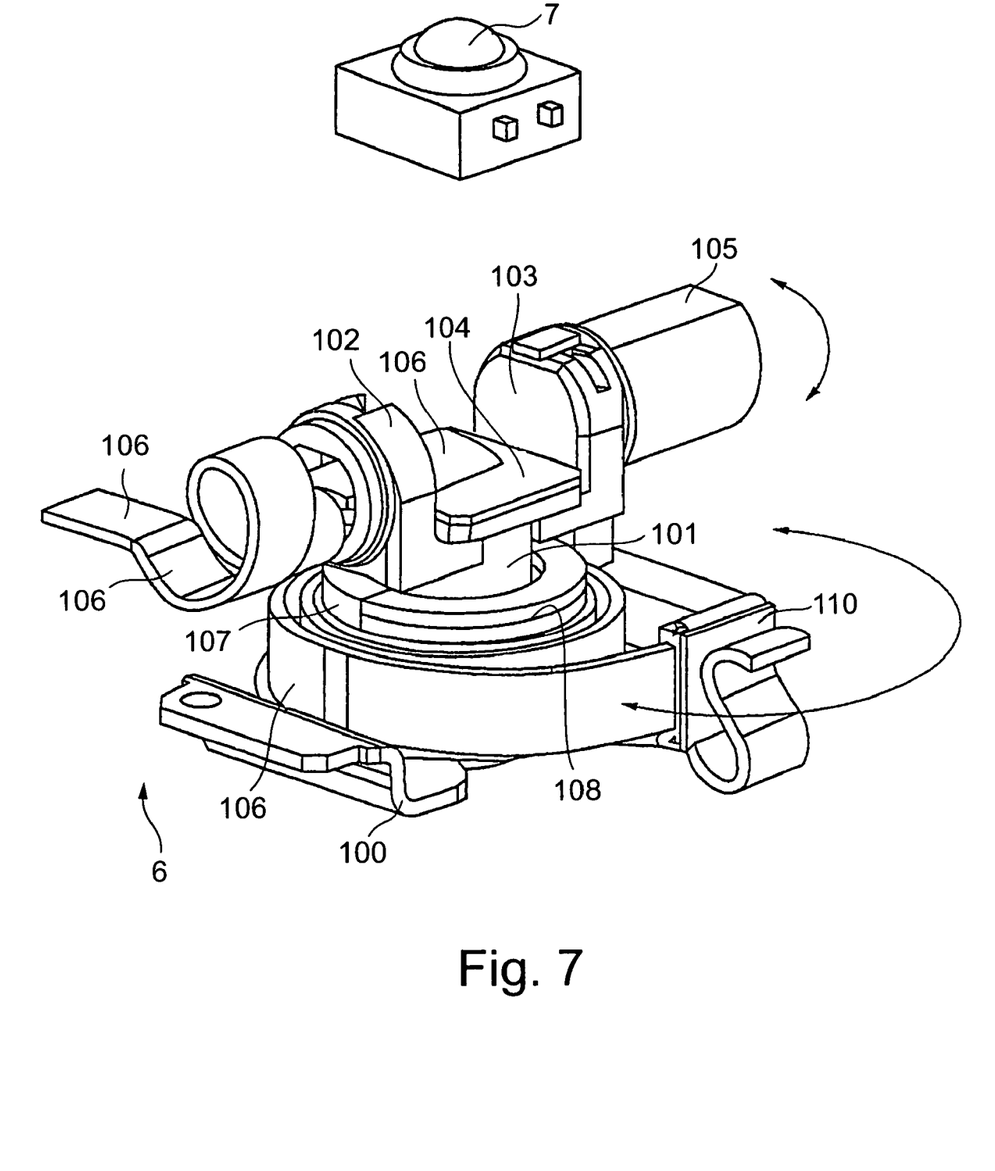
FIG. 7 is a perspective view of a preferred embodiment showing the detailed interior structure of a hinge of a folding mobile phone according to the present invention.

FIG. 7 is a perspective view of a preferred embodiment showing details of the interior structure of hinge 6 of folding mobile phone 1 according to the present invention.

In FIG. 7, hinge 6 includes a base 100, a horizontal rotation shaft 101, which is a first shaft member, and brackets 102 and 103, which are second shaft members fixed at the right and left of horizontal rotation shaft 101 in the direction perpendicular to horizontal rotation shaft 101. Base 100, which is a base portion of hinge 6, is fixed to lower unit 3. Horizontal rotation shaft 101 is held by a central portion of base 100 to lower unit 2 so that it can rotate.

Mount 104 is provided between brackets 102 and 103. Brackets 102 and 103 are fixed at an upper part of horizontal rotation shaft 101, and are connected to each other under mount 104. In the opening and closing shaft direction of bracket 103, perpendicular opening and closing shaft 105 is provided for operating upper unit 2 so it can be opened and closed. Further, flexible board fixing member 110 is provided for fixing flexible board 106 and bobbin 107 for winding flexible board 106 around horizontal rotation shaft 101.

Horizontal rotation shaft 101 is arranged on base 100 so that upper unit 2 is perpendicular to the face of input keys 5 on lower unit 3, and so that it can be turned in the horizontal plane with respect to the face of input keys 5.

Brackets 102 and 103, which are the opening and closing shaft members at the upper part of horizontal rotation shaft 101, and perpendicular opening and closing shaft 105 are fixed to upper unit 2, so that upper unit 2 can be turned horizontally through 180 degrees to the right and left with respect to the face of input keys 5 of lower unit 3 by the rotating operation of horizontal rotation shaft 101.

A space for mounting the aforementioned operation input section 7 is provided on the upper face of mount 104. An input device such as a track ball or a pointing device according to the slide amount of key may be used as operation input section 7. As the pointing device, for example, a device described in Japanese Patent Application Publication Laid-Open Kokai No. 2001-236351 may be used. However, the pointing device is not limited to the devices described in this publication.

Mount 104 may be mounted with an audio input device or an audio output device in addition to operation input section 7. Also, a light emitting element may be mounted on mount 4. The size of mount 104 is expandable in the lengthwise direction according to the device to be mounted thereon, by which a space capable of mounting the device can be secured.

Next, a connecting and attaching method using flexible board 106 for connecting a board of upper unit 2 to a board of lower unit 3 in hinge 6 will be explained. Flexible board 106 extending from a circuit board (not shown) of upper unit 2 is inserted into mount 104 in bracket 102 through a slot provided at an upper part of bracket 102 in a loose state with the flexible board being vertical. Herein, the loose state means the wound state shown in FIG. 7. Flexible board 106 passes through bracket 102 and mount 104 and is wound on bobbin 107. An electrical path is formed by a part of flexible board 106 passing through mount 104 and is electrically connected to operation input section 7.

Bobbin 107 is attached to the periphery of horizontal rotation shaft 101 has guide 108 at its upper part. Bobbin 107 does not rotate together with horizontal rotation shaft 101. Bobbin 107 is fixed to lower unit 3 or base 100. By winding flexible board 106 on bobbin 107, flexible board 106 wound around horizontal rotation shaft 101 can be prevented from shifting in an axial direction.

Flexible board 106 wound on bobbin 107 is bent through 90 degrees so that it can be connected to a board of lower unit 3, and a portion bent through 90 degrees is reinforced for high durability by flexible board fixing member 110, which prevents flexible board 106 from floating. After being fixed by flexible board fixing member 110, flexible board 106 is connected to a circuit board (not shown) of lower unit 3.

Figure 8:
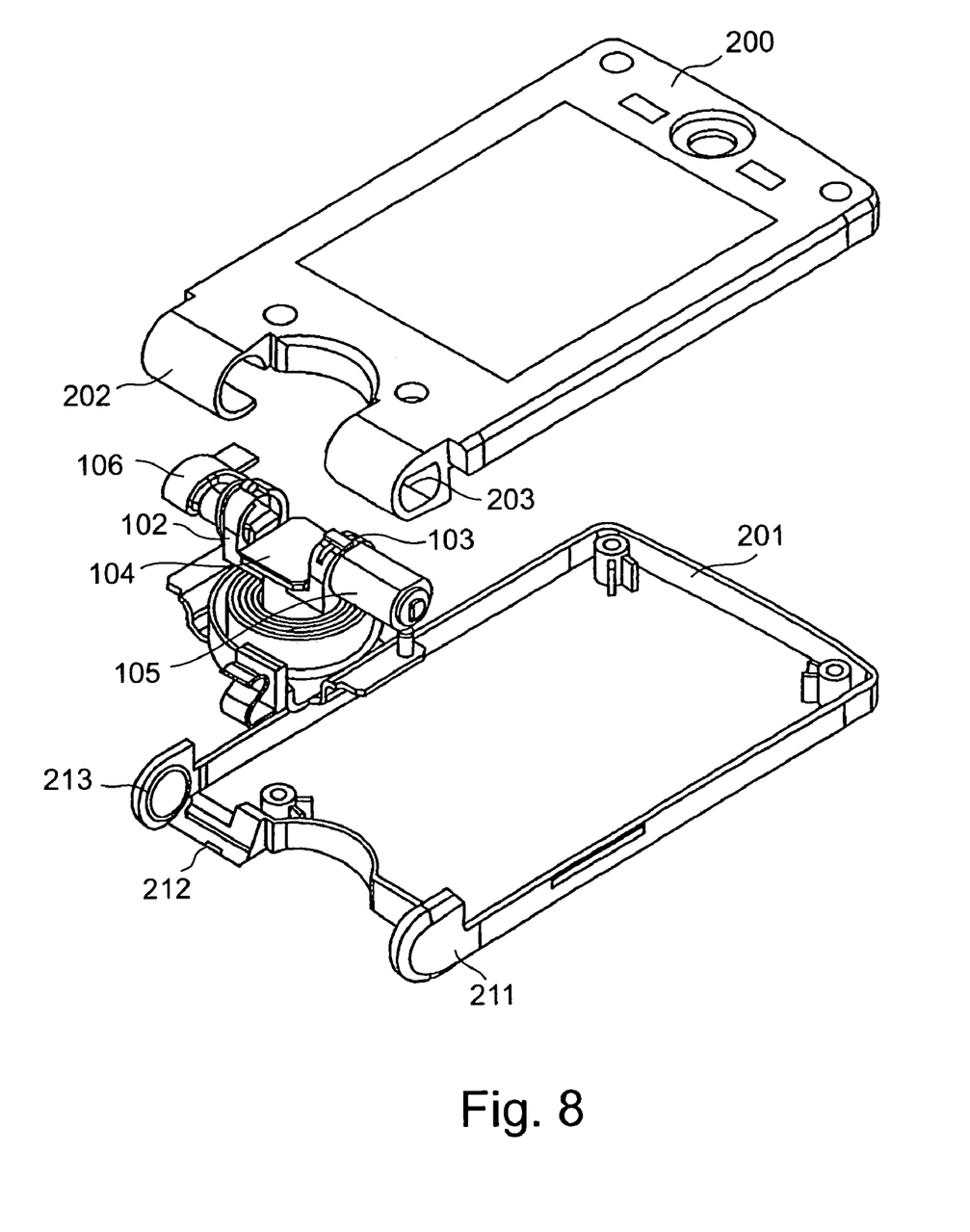
FIG. 8 is an exploded perspective view of a preferred embodiment showing the relationship between a hinge and a front cover and a back cover of an upper unit in a folding mobile phone according to the present invention.

FIG. 8 is an exploded perspective view of a preferred embodiment showing the relationship between hinge 6, front cover 200 and back cover 201 of upper unit 2 in folding mobile phone 1 according to the present invention. In FIG. 8, guide 108 for bobbin 107, as shown in FIG. 7, is omitted to make the figure understandable.

Front cover 200 and back cover 201 make up upper unit 2. Front cover engagement portions 202 and 203 are formed separately from each other to connect front cover 200 to hinge 6 at the tip end on the hinge side of front cover 200. Front cover engagement portion 202 is a cylinder having a substantially half moon shaped cross section, and flexible board 106 is arranged therein. Also, front cover engagement portion 202 is attached so that it can be fitted on a bush in the bracket 102. Front cover engagement portion 203 is a cylinder without a notch, and perpendicular opening and closing shaft 105 is fixed therein. Perpendicular opening and closing shaft 105, which is explained below, is inserted from one end of front cover engagement portion 203 from the rear and is fixed in a state in which front cover engagement portions 202 and 203 are connected to each other with brackets 102 and 103 being held therebetween, and is further fixed so that is can be turned with respect to bracket 103.

Side cover portion 213, cover member 212 and front cover engagement portion 202 restrain the movement of flexible board 104, and side cover 211 covers one end of perpendicular opening and closing shaft 105.

Figure 9:
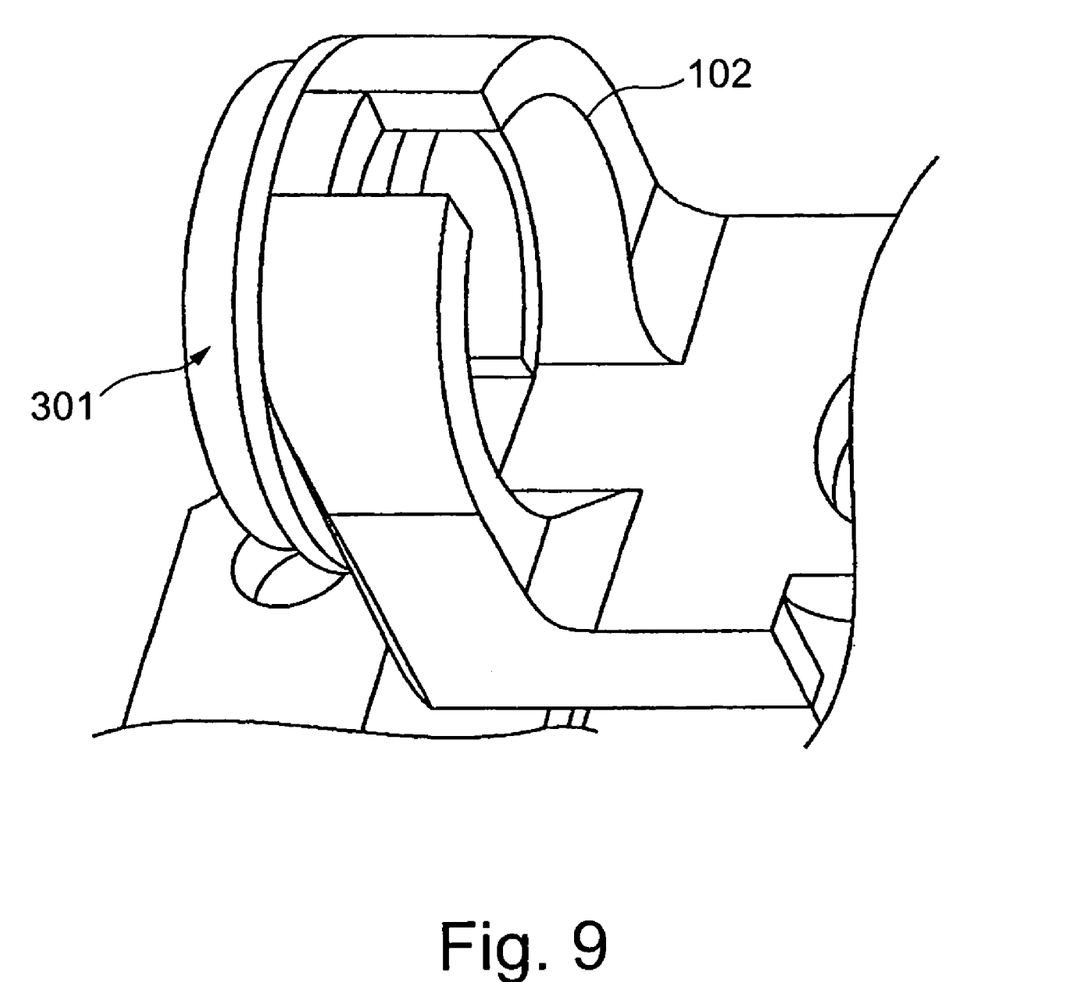
FIG. 9 is an enlarged perspective view of a preferred embodiment showing a bracket of a folding mobile phone according to the present invention.

FIG. 9 is an enlarged perspective view of a preferred embodiment showing bracket 102 of a folding mobile phone according to the present invention.

In FIG. 9, bush 301 is a fixed shaft for supporting the rotation of upper unit 2 moving along with the rotation of perpendicular opening and closing shaft 105, that is with the rotation due to opening and closing of upper unit 2. Front cover engagement portion 202, which is shown in FIG. 8, rotates while rubbing bush 301. Front cover engagement portion 202 is rotated because the inside diameter of front cover engagement portion 202 is slightly larger than bush 301.

When front cover engagement portion 202 engages with bush 301, flexible board 106 of hinge portion 6 passes through bush 301 in bracket 102 and is wound in the cylinder of front cover engagement portion 202, and thereby is connected to circuit board of upper unit 2.

Figure 10:
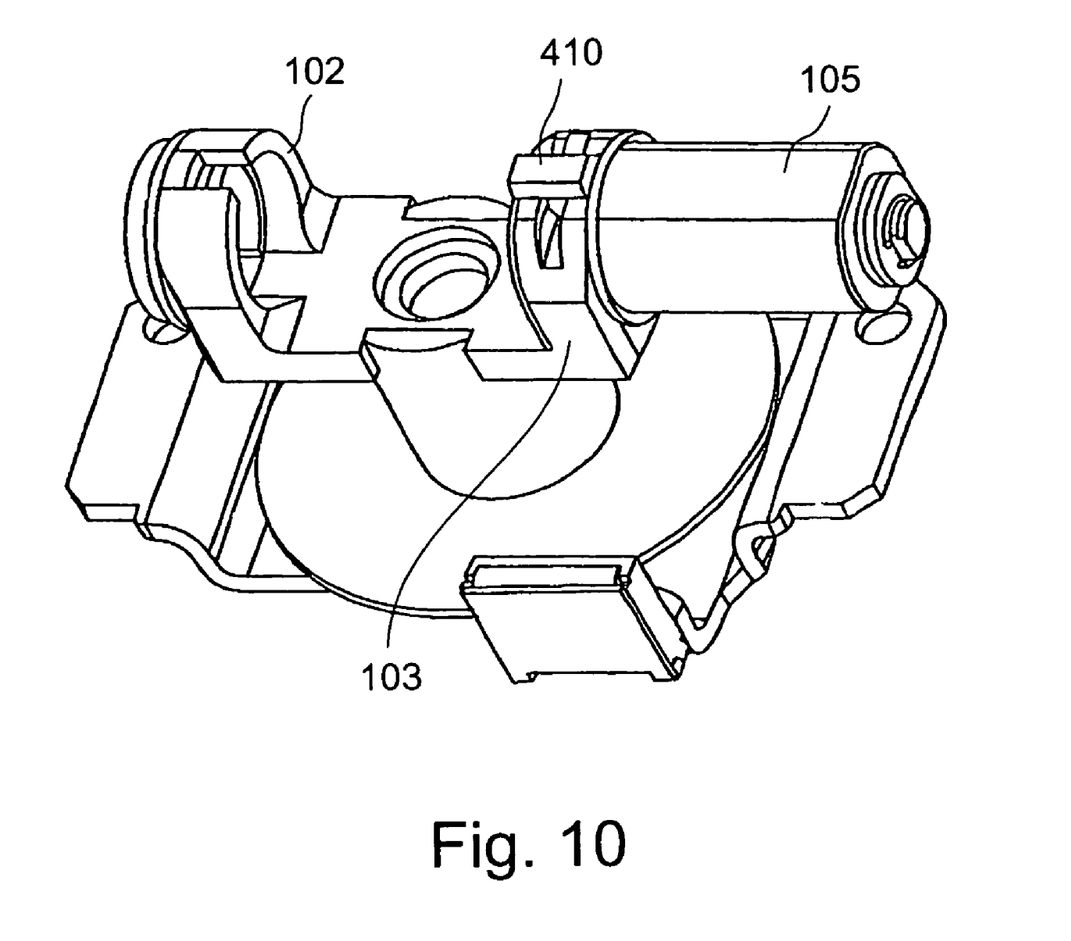
FIG. 10 is a perspective view of a preferred embodiment showing a state in which a perpendicular open and closed shaft and a bracket are connected to each other in a folding mobile phone according to the present invention.

FIG. 10 is a perspective view of a preferred embodiment showing a state in which perpendicular opening and closing shaft 105 and bracket 103 are connected to each other in a folding mobile phone according to the present invention.

In FIG. 10, mount 104, flexible board 106, front cover 200, and back cover 201 shown in FIG. 5 are omitted. Bracket 103 adjoins front cover engagement portion 203, which is shown in FIG. 8, when perpendicular opening and ciosing shaft 105 penetrates front cover engagement 203. Front cover engagement portion 203 has a cylindrical shape as shown in FIG. 8, perpendicular opening and closing shaft 105 passes in front cover engagement portion 203, head 401 of perpendicular opening and closing shaft 105 is embedded in a recess provided in advance in bracket 103, and pin 410 is inserted from the upper part of bracket 103 to penetrate perpendicular opening and closing shaft 105, by which head 401 (described below) is fixed to bracket 103. The above method in which head 401 is fixed to bracket 103 is only one preferred embodiment. Other methods of fixing head 401 to bracket 103 can be used.

Figure 11:
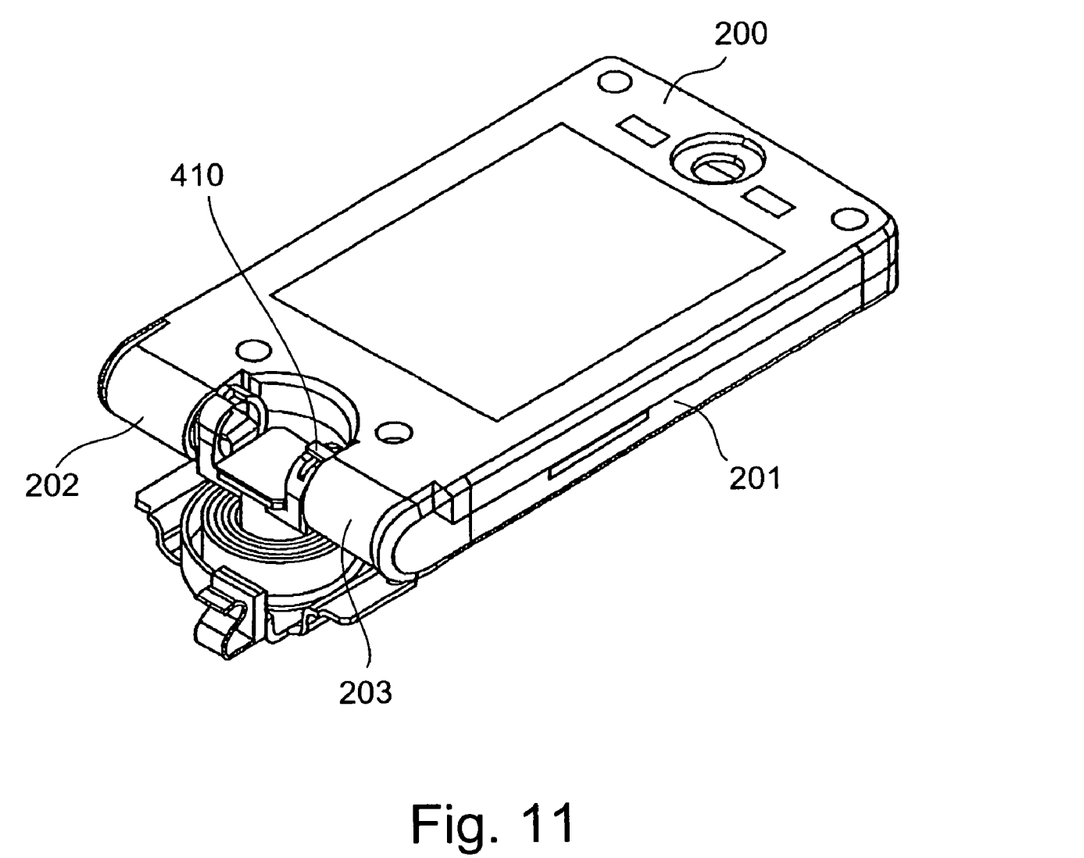
FIG. 11 is a perspective view of a preferred embodiment showing a state in which a front cover and a back cover are engaged with each other in a folding mobile phone according to the present invention.

FIG. 11 is a perspective view of a preferred embodiment showing a state in which front cover 200 and back cover 201 are engaged with each other in a folding mobile phone according to the present invention.

Referring to FIG. 11, perpendicular opening and closing shaft 105 is inserted from one end of front cover engagement portion 203 and is fixed to bracket 103 by pin 410, and then back cover 201 is fitted to front cover 200.

In this embodiment, flexible board 106, in a loose state, is arranged in a space on one side (bracket 102 side) in the opening and closing shaft direction of brackets 102 and 103, which are the opening and closing shaft members, and perpendicular opening and closing shaft 105 is arranged on the other side (bracket 103 side) in the opening and closing shaft direction of brackets 102 and 103. Therefore, flexible board 106 does not need to be wound around the shaft. Also, since flexible board 106 does not interfere with perpendicular opening and closing shaft 105, the diameters of front cover engagement portions 202 and 203 can be decreased, and the diameter of the hinge can be decreased.

Figures 12A, 12B:
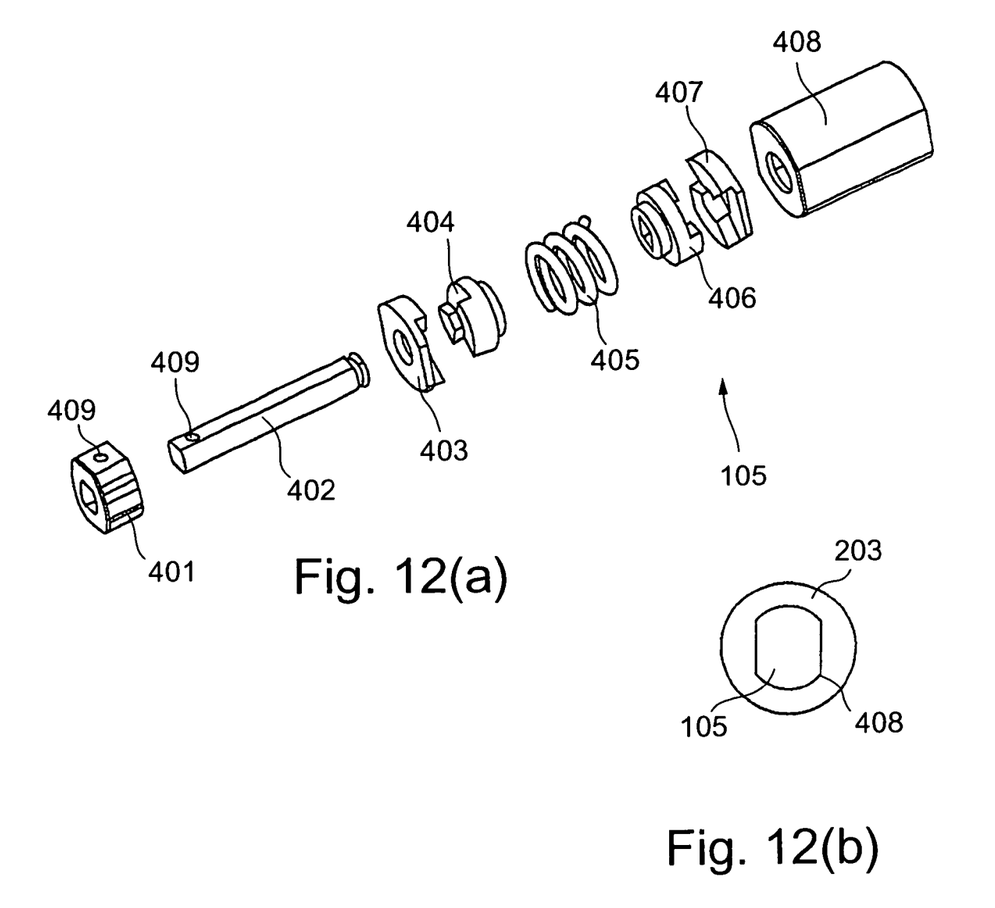

FIG. 12 (*a*) is an exploded view showing a construction of perpendicular opening and closing shaft 105 and FIG. 12 (*b*)

is a sectional view of a front cover engagement portion 203 in a folding mobile phone according to the present invention.

Perpendicular opening and closing shaft 105 for perpendicularly rotating (opening and closing) operation of upper unit 2 with respect to lower unit 3 is inserted in the cylindrical portion of the front cover engagement portion 203. In the perpendicularly rotating (opening and closing) operation, upper unit 2 can be turned within 180 degrees with respect to lower unit 3 with a shaft 402 shown in FIG. 12 (a) serving as a central axis. Perpendicular opening and closing shaft 105 is made up of shaft 402, which is the center-of rotation, head 401 for turning shaft 402, fixed cam A 403 fixed to shaft 402, rotating cam A 404 paired with fixed cam A 403, rotating cam B 406 fixed to shaft 402, fixed cam B 407 paired with rotating cam B 406, spring 405 for pressing rotating cam A 404 and rotating cam B 406 against fixed cam A 403 and fixed cam B 407, respectively, and cover 408 for covering these elements.

Cover 408 of perpendicular opening and closing shaft 105 has a non-circular cross section so that the movement of perpendicular opening and closing shaft 105 is directly transmitted to the front cover engagement portion 203 as shown in FIG. 8. The shape of the cross section of cover 408 is not subject to any special restriction if the shape is such that cover 408 engages with front cover engagement portion 203 and hence the rotation of perpendicular opening and closing shaft 105 is transmitted to upper unit 2.

Next, the operation of perpendicular opening and closing shaft 105 will be explained. Rotating cam A 404 is fixed to shaft 402 and is rotated together with shaft 402. Fixed cam A 403 fixed to cover 408 and rotating cam A 404 are provided so that rotating cam A 404 and fixed cam A 403 are engaged with each other when upper unit 200 is in a closed (0 degree) state to produce suction torque of the closed side (0 degree). Similarly, fixed cam B 407 fixed to cover 408 and rotating cam B 406 are provided so that rotating cam B 406 and fixed cam B 407 are engaged with each other when upper unit 200 is in an opened (180 degree) state to produce suction torque of the opened side (180 degree).

Next, the assembly of perpendicular opening and closing shaft 105 will be explained. The tip end of shaft 402 is installed in head 401, and shaft 402 is caused to pass through a hole formed in the cover 408, by which an exposed portion of shaft 402 is covered with cover 408. Subsequently, fixed cam A 403, rotating cam A 404, spring 405, rotating cam B 406, and fixed cam B 407 are slipped onto shaft 402 in succession. After all elements are assembled, shaft 402 is caulked, which fixes shaft 402 so that it does not to come off.

The connecting relationship between perpendicular opening and closing shaft 105 and bracket 103 as shown in FIG. 10 will now be described. After head 301 of perpendicular opening and closing shaft 105 is arranged in a concave portion provided in bracket 103, perpendicular opening and closing shaft 105 is connected to bracket 103 with pin 401 as shown in FIG. 10 so that pin 410 penetrates perpendicular opening and closing shaft 105 from the upper part of bracket 103. Head 401 of perpendicular opening and closing shaft 105 and shaft 402 each are formed with through hole 409 for causing pin 410 to penetrate to fix perpendicular opening and closing shaft 105 to bracket 103 at this time. By the connection of perpendicular opening-and closing shaft 105 and bracket 103, head 401 and shaft 402 of perpendicular opening and closing shaft 105 are connected to bracket 103, so that head 401 and shaft 402 are fixed during the opening and closing operation. When upper unit 2 is opened or closed by perpendicular opening and closing shaft 105, fixed cam A 403, rotating cam A 404, spring 405, rotating cam B 406, fixed cam B 407 and cover 408 other than head 401 and shaft 402 are operated together with upper unit 2.

In this embodiment, perpendicular opening and closing shaft 105 is fixed to bracket 103 by inserting pin 401 in perpendicular opening and closing shaft 105 fixed to bracket 103 from upper part of bracket 103. However, perpendicular opening and closing shaft 105 may be attached to bracket 103 using pressure by providing perpendicular opening and closing shaft 105 fixing portion on lower unit 3 and by pressing perpendicular opening and closing shaft 105 from the outside.

In the above-described embodiment, since front cover engagement portion 203 of front cover 200 has a closed cylindrical shape as shown in FIG. 8, when perpendicular opening and closing shaft 105 is installed, as shown in FIG. 8, it is necessary to insert perpendicular opening and closing shaft 105 in front cover engagement portion 203. However, if front cover engagement portion 203 has an accurate cross section, front cover 200 can be fitted over perpendicular opening and closing shaft 105 after perpendicular opening and closing shaft 105 is fixed in advance to bracket 103.

Also, perpendicular opening and closing shaft 105 may be configured so that it is fixed to back cover 201, and not to front cover 200. In any case, any configuration can be used in which perpendicular opening and closing shaft 105 rotates integrally around an opening and closing shaft along with the opening and closing of upper unit 2.

Also, in this embodiment, the horizontal rotation shaft 101 is arranged so that it is vertical with respect to the face of input key 5 and is provided so that it can be rotated in a horizontal plane with respect to the face of input key 5, and the opening and closing shaft members (brackets 102 and 103) are fixed to horizontal rotation shaft 101. However, the present invention is not limited to this configuration. For example, the configuration may be such that horizontal rotation shaft 101 is not rotated and is fixed to base 101, and brackets 102 and 103, which are opening and closing shaft members, are fixed to horizontal rotation shaft 101 and turn in the horizontal plane around the non-rotating horizontal rotation shaft.

The above description of an embodiment of this invention has been made by taking a mobile phone by way of example. However, the invention is not limited to a mobile phone. The present invention can also be applied to any personal digital assistant in which the operating section and the display section are separated so that they can be foldable and the operation input section can be mounted on the horizontal rotation shaft, and can achieve the same advantages.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A folding electric device comprising:
   an upper unit;
   a lower unit;
   a connecting member that electrically connects said upper unit to said lower unit; and
   a hinge that connects said upper unit to said lower unit, wherein said hinge comprises:
   a perpendicular opening and closing shaft to perpendicularly open and close said upper unit with respect to said lower unit; and a horizontal rotation shaft, connected to said lower unit, to horizontally rotate said upper unit with respect to said lower unit, wherein said upper unit comprises:

a first engagement portion having said perpendicular opening and closing shaft inserted therein;

a second engagement portion having said connecting member arranged therein; and first and second brackets which are fixed to the horizontal rotation shaft, wherein the first brackets supports the perpendicular opening and closing shaft, the connecting member is inserted into the second bracket, and said connecting member is inserted into said second engagement portion but not into said first engagement portion.

2. The folding electric device as claimed in claim 1, wherein said horizontal rotation shaft is connected to said lower unit vertically to a surface of said lower unit.

3. The folding electric device as claimed in claim 1, wherein said horizontal rotation shaft is located between said first and second engagement portions.

4. The folding electric device as claimed in claim 1, wherein said first engagement portion and second engagement portion are formed separately from each other.

5. The folding electric device as claimed in claim 1, wherein said connecting member is wound around said horizontal rotation shaft.

6. The folding electric device as claimed in claim 1, wherein said connecting member is a winding flexible board.

7. The folding electric device as claimed in claim 6, further comprising an operation input section, mounted on said hinge and electrically connected to said winding flexible board so that a user can operate said operation input section when said folding electric device is in a folded state.

8. The folding electric device as claimed in claim 6, further comprising a bobbin, arranged between said horizontal rotation shaft and said base, for winding said winding flexible board around said horizontal rotation shaft.

9. The folding electric device as claimed in claim 6, further comprising flexible board fixing member for fixing said flexible board to said hinge.

10. The folding electric device as claimed in claim 1, wherein said folding electric device is a folding mobile phone.

11. The folding electric device as claimed in claim 1, further comprising a display arranged on said upper unit.

12. The folding electric device as claimed in claim 1, further comprising input keys arranged on said lower unit.

13. The folding electric device as claimed in claim 1, wherein the first bracket is fixed on a first side of the horizontal rotation shaft in a direction of the perpendicular opening and closing shaft, and the second bracket is fixed on a second side of the horizontal rotation shaft opposite to the first side.

14. A folding electric device comprising:

an upper unit;

a lower unit;

a connecting member that electrically connects said upper unit to said lower unit; and a hinge that connects said upper unit to said lower unit, wherein said hinge comprises:

a perpendicular opening and closing shaft to perpendicularly open and close said upper unit with respect to said lower unit; and a horizontal rotation shaft, connected to said lower unit, to horizontally rotate said upper unit with respect to said lower unit, wherein said upper unit comprises:

a first engagement portion having said perpendicular opening and closing shaft inserted therein; and a second engagement portion having said connecting member arranged therein, further comprising:

first and second brackets which are fixed to the horizontal rotation shaft, wherein the first bracket supports the perpendicular opening and closing shaft, the connecting member is inserted into the second bracket, and a part of the second bracket engages with the second engagement portion.

15. The folding electric device as claimed in claim 14, wherein the first bracket is fixed on a first side of the horizontal rotation shaft in a direction of the perpendicular opening and closing shaft, and the second bracket is fixed on a second side of the horizontal rotation shaft opposite to the first side.

16. A folding electric device comprising:

an upper unit;

a lower unit;

a connecting member that electrically connects said upper unit to said lower unit; and a hinge that connects said upper unit to said lower unit, wherein said hinge comprises:

a perpendicular opening and closing shaft to perpendicularly open and close said upper unit with respect to said lower unit; and a horizontal rotation shaft, connected to said lower unit, to horizontally rotate said upper unit with respect to said lower unit, wherein said upper unit comprises:

a first engagement portion having said perpendicular opening and closing shaft inserted therein; and first bracket and second bracket which are fixed to the horizontal rotation shaft, wherein the first bracket supports the perpendicular opening and closing shaft, the connecting member is inserted into the second bracket, and the connecting member is wound in a space on an extension line of one end side of the perpendicular opening and closing shaft.

17. The folding electric device as claimed in claim 16, wherein said horizontal rotation shaft is connected to said lower unit vertically to a surface of said lower unit.

18. The folding electric device as claimed in claim 16, wherein said horizontal rotation shaft is located between said first and second engagement portions.

19. The folding electric device as claimed in claim 16, wherein said first engagement portion and second engagement portion are formed separately from each other.

20. The folding electric device as claimed in claim 16, wherein said connecting member is wound around said horizontal rotation shaft.

21. The folding electric device as claimed in claim 16, wherein said connecting member is a winding flexible board.

22. The folding electric device as claimed in claim 21, further comprising an operation input section, mounted on said hinge and electrically connected to said winding flexible board so that a user can operate said operation input section when said folding electric device is in a folded state.

23. The folding electric device as claimed in claim 21, further comprising a bobbin, arranged between said horizontal rotation shaft and said base, for winding said winding flexible board around said horizontal rotation shaft.

24. The folding electric device as claimed in claim 21, further comprising flexible board fixing member for fixing said flexible board to said hinge.

25. The folding electric device as claimed in claim 16, wherein said folding electric device is a folding mobile phone.

26. The folding electric device as claimed in claim 16, further comprising a display arranged on said upper unit.

27. The folding electric device as claimed in claim 16, further comprising input keys arranged on said lower unit.

* * * * *